Nov. 28, 1950  J. F. CHAPMAN ET AL  2,532,086
BRAKE DRUM WITH NOISE SILENCER
Filed Dec. 10, 1948  3 Sheets-Sheet 1

INVENTORS.
JAMES F. CHAPMAN.
BY ELMER LATSHAW.

Alden D. Redfield
ATTY

Nov. 28, 1950 J. F. CHAPMAN ET AL 2,532,086
BRAKE DRUM WITH NOISE SILENCER
Filed Dec. 10, 1948 3 Sheets-Sheet 2

INVENTORS.
JAMES F. CHAPMAN.
BY ELMER LATSHAW.

Alden P. Redfield
ATTY.

Nov. 28, 1950 J. F. CHAPMAN ET AL 2,532,086
BRAKE DRUM WITH NOISE SILENCER
Filed Dec. 10, 1948 3 Sheets-Sheet 3

INVENTORS.
JAMES F. CHAPMAN.
BY ELMER LATSHAW.

Alden Q. Redfield,
ATTY.

Patented Nov. 28, 1950

2,532,086

UNITED STATES PATENT OFFICE 2,532,086

BRAKE DRUM WITH NOISE SILENCER

James F. Chapman, Upper Darby, and Elmer Latshaw, Philadelphia, Pa., assignors to ACF-Brill Motors Company, Philadelphia, Pa., a corporation of Delaware Application December 10, 1948, Serial No. 64,563

6 Claims. (Cl. 188—218)

The present invention relates generally to devices and methods for preventing mechanical vibrations from attaining audibility and specifically to a novel device and process for preventing sensible audio-frequency mechanical vibrations in motor vehicle brake drums. The invention is particularly directed to a novel vibration neutralizer for a brake drum, having such construction and operation that the mechanical vibration occasioned by dynamic frictional restraint on the drum is effectively silenced throughout the frequency range of the audible vibrations normally experienced in motor vehicle practice.

For many years the ingenuity and inventive faculties of those skilled in the art have been persistently devoted to various attempts to solve, in a commercially practicable manner, the problem presented by brake "squeal." The large volume of research conducted indicates that the loud, high pitched noise popularly known as "squeal" is due in large measure to mechanical resonance in the brake drum. The mathematical treatment and analysis of this acoustic phenomenon indicates that a generally cylindrical brake drum behaves, in response to the disturbing forces occasioned by the dynamic friction of the brake shoe, as the equivalent of a bell when responding to the impact of its clapper. It is generally considered that the noise initiated by frictional contact is amplified or augmented by the resonant vibration of the drum. Support is given to this theory by the central fastening of the flanged face of the brake drum to the wheel and the highly vibratile nature of its generally cylindrical brake-shoe-engaging portion. The customary practice of applying a motor vehicle brake involves the pressure of a brake band or shoe on the annular brake-engaging portion of the drum. The band or shoe may be either externally contracting or internally expanding and the preferred embodiments of the invention herein shown are associated for purposes of illustration with a brake drum of the internally expanding type, although they are not limited to utility with that specific type of brake.

It has been observed that brake "squeal" is aggravated when foreign matter becomes lodged between the brake drum and the brake shoe and that temperature and other atmospheric conditions affect the degree of "squeal" to some extent. Our own researches have indicated that the audible frequencies of the various major components of brake "squeal" sound, during all conditions encountered in ordinary motor bus transportation, lie principally within the range of 1000 to 3400 cycles per second.

The prior art includes the following expedients, none of which has met with general commercial acceptance, for reducing brake squeal, enumerated not necessarily in order of significance:

(1) Annular damping bands, of rubber or other soft material, stretched about the periphery of the drum and in concentric relation thereto;

(2) Annular bands of rope or the like, tensioned by an imbedded spring;

(3) Stretched concentric coil springs disposed externally of the drum for damping purposes;

(4) Damping means associated with the shoes;

(5) Spring spokes pressed against the back plate for damping its vibrations;

(6) Internal damping springs;

(7) Inert masses for asserting a restraining or damping action on the backing plate or closed end of the drum;

(8) External metallic laminations located radially outwardly of the drum for damping its vibration;

(9) Internal cavities formed in the cylindrical portion of the drum and filled with sound-deadening material;

(10) External rings or ring segments annularly disposed about the drum and separated therefrom by heating insulating supports.

Actual or attempted practice of any of the foregoing expedients is attended with one or more of the following limitations:

(1) Rubber and other soft or non-metallic materials disintegrate under actual commercial operating conditions, particularly in the bus field, where the external surface of the cylindrical portion of a brake drum consistently runs at a temperature of the order of 500° F., as witness the various patents which have issued to those working on that specific cooling problem;

(2) The space limitations imposed by the proximity of the brake drum to the wheel, tire rim and springs do not permit adoption of such expedients in the absence of special tools, complicated industrial processes and over-all design changes which involve detriments substantially greater than the evil sought to be prevented;

(3) The tendency of certain of these prior art expedients to create dynamic unbalance of the brake drum, a major objection, as witness the patents issued to those who have worked on the problem of balancing the brake drum assembly;

(4) Failure to cover the major part of the frequency range of the principal components of brake "squeal" or "screech";

(5) Initiation of preventive measures at the wrong place, as in the case of those devices which primarily affect brake shoe behavior.

So far as we are aware, no one has heretofore evolved a directive concept contemplating the provision of a dynamic vibration neutralizer carried by the brake drum for rendering its vibrations inaudible, combined with a damping means for so restraining the flexure of the neutralizer as to render the undesired normally sound-producing vibrations of the brake drum inaudible throughout the frequency range most objectionable to the ear.

Our device represents a thoroughly tried and commercially practicable application of these principles in concrete physical form. The invention is directed to the following objectives:

(1) To provide the combination of a secondary or auxiliary mechanical resonator carried by the drum and damping means so controlling the secondary resonator that the sound producing frequencies of the drum are rendered inaudible throughout their range;

(2) To provide a device of the character mentioned which may be installed with facility and rapidity;

(3) To provide a device which is durable under actual operating conditions where tremendous pressures, high temperatures and adverse weather conditions are imposed on the brake system;

(4) To provide a device of the character mentioned which may be installed within the limited space available but which employs a resonator having sufficient mass to control brake-drum vibration.

In accordance with a specific and narrow aspect of the invention, we provide a device for rendering inaudible the sound producing vibrations of a brake drum of a conventional generally bell shaped configuration. This device comprises four circumferentially symmetrically and diametrically oppositely disposed masses mounted on the peripheral edge of the open end of the drum. These masses are preferably constructed so that they are tuned to one or more frequencies approximating the major squeal frequencies. These devices are curved to conform segmentally in continuity to the drum. Each of these members is formed with cantilevers which vibrate or flex in response to the sound producing primary vibrations of the drum. Each of these members is cambered and has two spaced frictional bearing areas in contact with the said edge. Further, in accordance with the invention, each of the tuned members is provided with fixed mounting means comprising spaced bolts intermediate the bearing areas. These spaced bolts rigidly secure the said intermediate areas of said members to the peripheral edge of said drum. With such a structure the secondary response frequency band of each of the tuned members is broadened to include the major primary vibration frequencies encountered in commercial motor vehicle practice.

For a better understanding of the invention, together with further objects, capabilities and advantages thereof, reference is made to the following description of the accompanying drawings in which there are shown a preferred and a modified embodiment of a brake "squeal" preventing device, in accordance with the invention.

Figure 1:
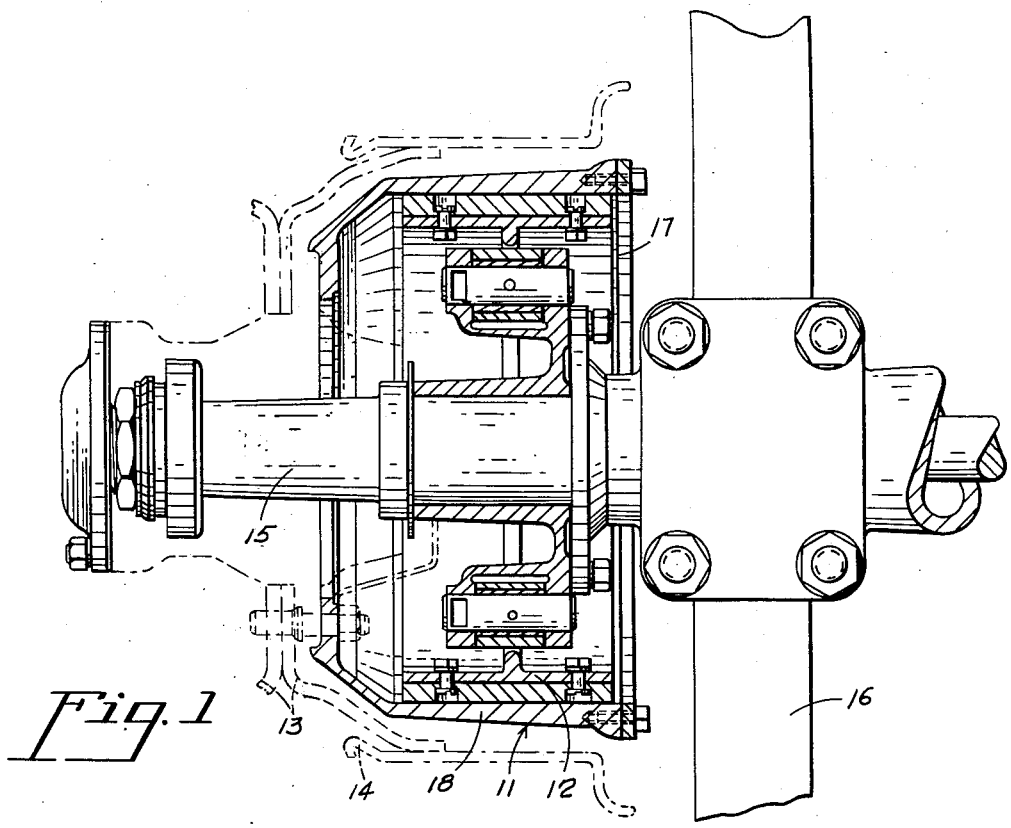
Fig. 1 is a central-sectional view taken diametrically through the assembly of brake drum, wheel, axle, rims and brake shoe, showing a preferred embodiment of a "squeal" preventing device in accordance with the invention.
Figure 2:
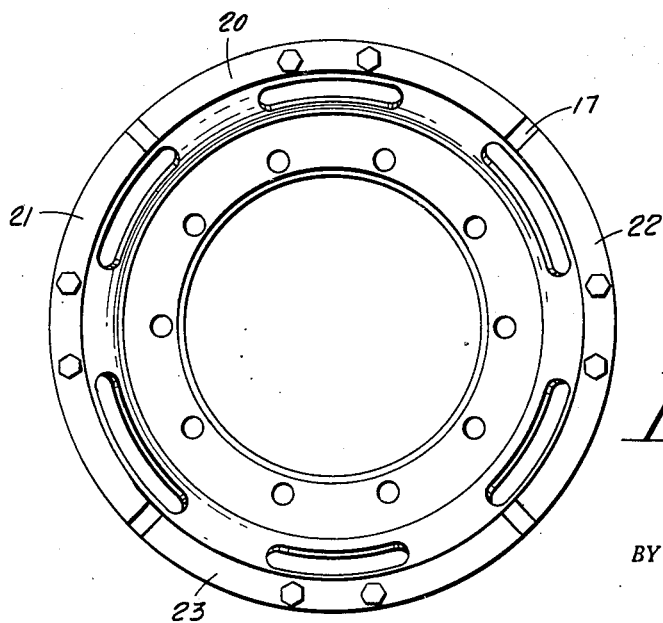
Fig. 2 is a view of the brake drum showing the open end of the drum with four resonator bars and their associated attaching means secured to the peripheral edge of the drum.

Referring now specifically to Fig. 1, which shows a brake drum 11, an expanding brake shoe 12, dual wheels 13, a rim 14, an axle 15, and a spring 16 in conventional arrangement, it will be apparent that the space between the peripheral edge 17 of the brake drum and the rim 14 is very small. Likewise, the space between the edge 17 and the spring 16 is very limited. These confined space characteristics preclude the use of many of the above-mentioned prior art arrangements which have been suggested for the prevention of brake "squeal." The confined space effectively establishes an upper limit for the sizes or masses of the sound-prevention means used. The energy involved in brake drum squeal indicates that relatively large masses are required, in order to control the sound-producing vibration. It is believed that our device resolves these conflicting requirements. The cylindrical portion 18 of the brake drum 11 normally rotates at high angular speeds and attains temperatures of the order of 500° F. It will be understood by those conversant with this art that when the brake is applied the rotation of the drum 11 is impeded by the internally expanding brake shoe 12, frictional forces being impressed by the brake shoe on the drum 18 to decelerate the vehicle and bring it to a stop. It is well known that large quantities of kinetic energy must be dissipated in the brake system and very substantial disturbing forces, tending to cause vibration of the drum 11, are imposed on the drum by the action of the brake shoe. A disagreeable squeak or noise is emitted because of the resultant vibrations which are set up in the drum. As stated above, the significant sound-producing frequency components thereof have been experimentally ascertained by us to lie within the approximate range from 1000 cycles per second to 3400 cycles per second. It will be seen that the bell-like shape of the brake drum is such that it is highly susceptible, when under frictional restraint, to resonating at these undesired sound-producing frequencies.

Figure 5:
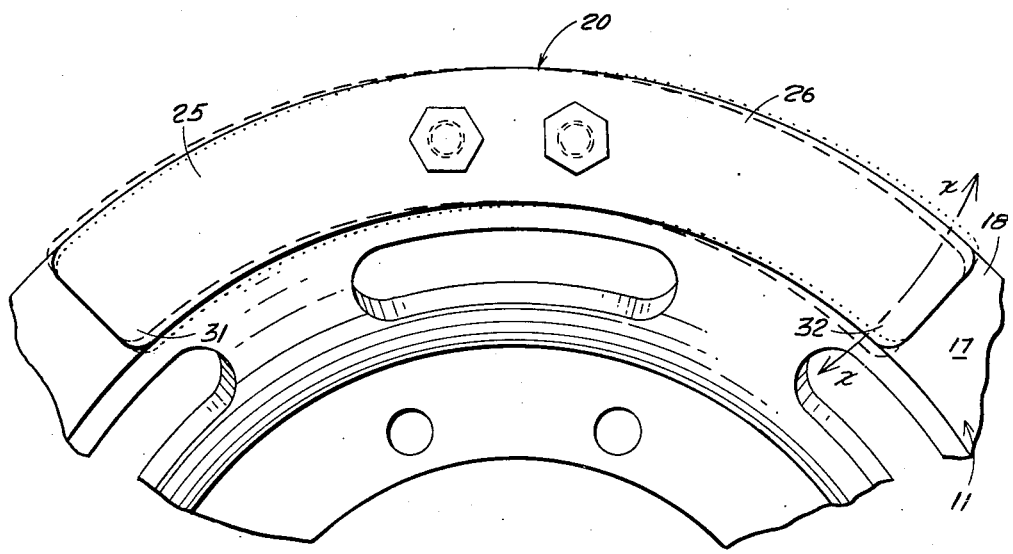
Fig. 5 is a plan view of a typical resonator bar employed in the preferred embodiment.
Figure 6:
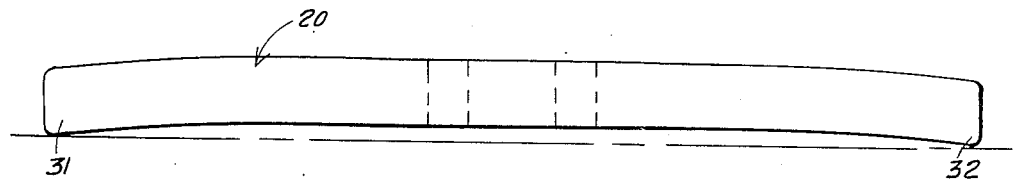
Fig. 6 is an elevational view of that resonator bar, taken from a point radially outwardly of the drum and showing it in relaxed condition.
Figure 7:
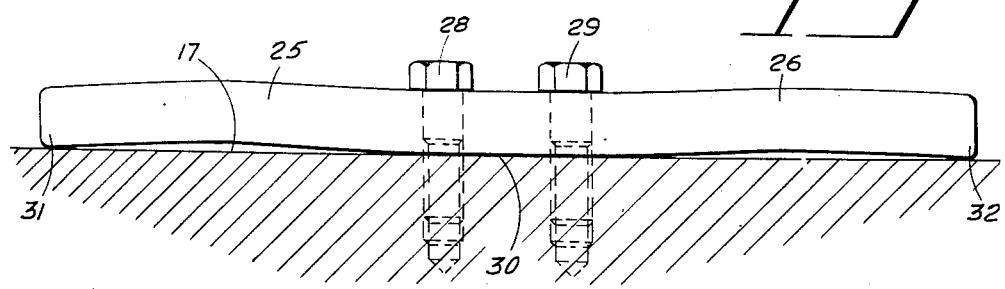
Fig. 7 is a view similar to Fig. 6 but illustrating the bar when fixedly secured to the drum.

One of the directive concepts of the invention is to provide a dynamic vibration neutralizer for rendering inaudible these primary vibrations. Accordingly we mount on the peripheral edge of the drum a plurality of auxiliary and secondary mechanically vibrating members or resonator bars 20, 21, 22 and 23. These bars are spaced apart by 90 degrees. Each pair is diametrically opposed, and all are symmetrically disposed. Each such bar, such as member 20, for example (Fig. 5), is of arcuate shape in the plane of its width and length and is formed essentially as a segment which conforms in continuity to the drum. It will be understood that the description of the bar 20 is equally applicable to the bars 21, 22 and 23. The four bars taken together embrace a major portion of the radially outermost margin of the said peripheral edge of the brake drum. Each member comprises a pair of arms 25 and 26 which individually vibrate in flexure as cantilevers as shown in dotted and in dashed lines in Fig. 5. Each member is bowed or cambered when in relaxed condition, as indicated in Fig. 6. The direction of the bow is concave as shown. The bar 20 is secured to the edge 17 by a pair of spaced bolts 28 and 29. These bolts are adjusted to tightly secure the central bearing area 30 against the edge 17 of the drum, and the bolts constitute the cantilever supports. They are thus fixed in order to prevent rotation of the member 20 relative to the drum particularly in the direction of the arrows XX in Fig. 5.

The portions 31 and 32 of bar 20 constitute friction bearing areas which abut against the drum edge and the frictional contact between the bars and the drum introduces a damping action which tends to make the bars responsive to a broad frequency range. The organization of the instrumentalities recited is such that the primary vibrations emanating from drum 11 are suppressed.

Figure 8:
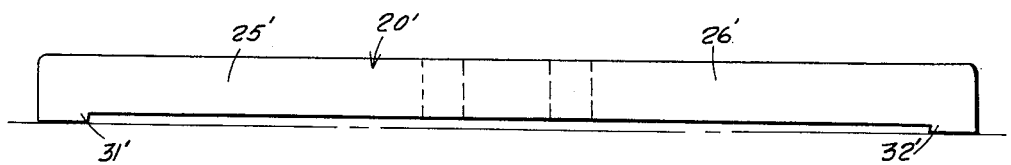
Fig. 8 is a view corresponding to Fig. 6, showing a suitable alternative form of secondary resonant member for incorporation in the Fig. 1 embodiment.
Figure 9:
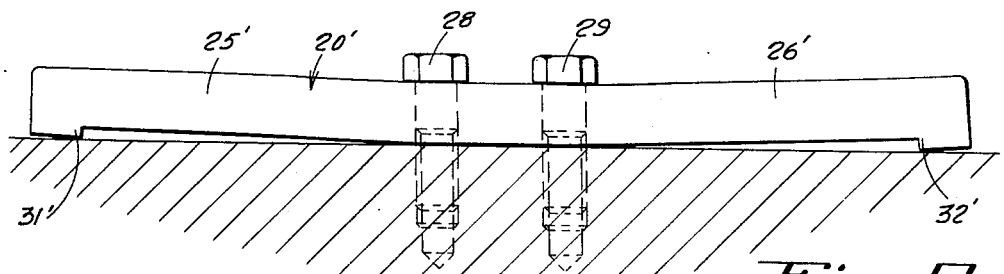
Fig. 9 is a view corresponding to Fig. 7 but relating to the Fig. 8 embodiment.

In Figs. 8 and 9 is shown an alternative form of vibration neutralizer suitable for incorporation in the Fig. 1 embodiment. This neutralizer comprises a pair of arms 25' and 26' having integral-spaced contact or bearing areas 31' and 32' formed as steps at the ends thereof. These surfaces 31' and 32' abut the edge 17 of the drum. The operations of bars 20 and 20' are substantially the same.

While we do not wish to be entirely restricted to any particular theory of operation of our brake-squeal preventing device, other than the vibration-neutralizing characteristic of the members 20—23 and the damping of such members, we believe that the success of this invention is attributed in part to the following-described theory and operation.

Our tuned cantilevers set up a reaction which appears as a high-mechanical impedance (corresponding to an electrical open circuit or high impedance) to the disturbing forces, minimizing sound-producing energy storage in the drum. Applicants go still further and provide damping means acting on the bars to dissipate the energy in the bars and at the same time broadening their frequency response.

Figures 3, 4:
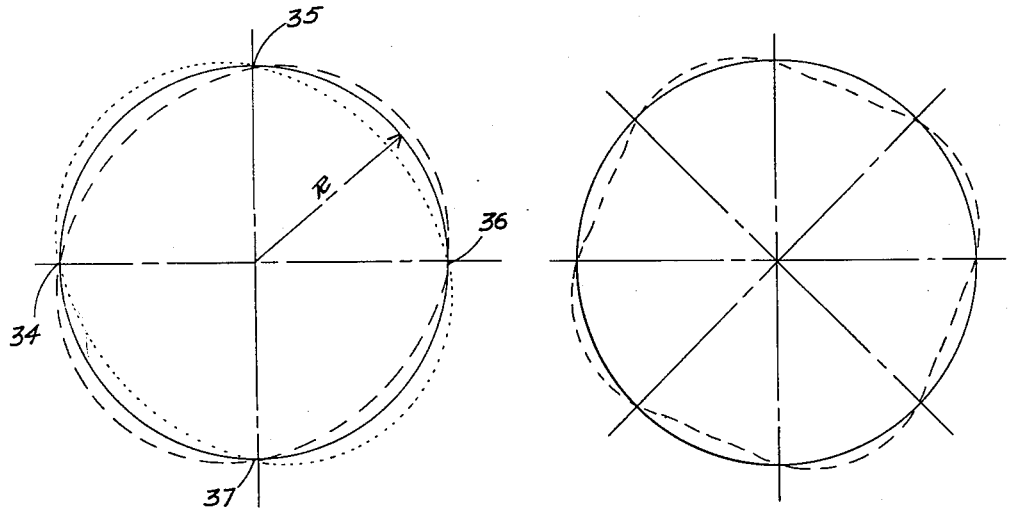
Figs. 3 and 4 are diagrams employed for illustrative purposes in explaining the generally accepted theory of the mode of vibration of a brake drum or bell-like device.

Referring now specifically to Fig. 3 of the drawings, there is symbolically shown the flexure of the cylindrical portion of a bell-like device, for the lowest audio-frequency mode, according to the bell-vibration studies of den Hartog. Vibration at higher-frequency modes produces variable patterns of different configurations such for example as that shown in Fig. 4. The full line circle (Fig. 3) illustrates the relaxed or static position of that section of the drum cylinder 12 adjacent the edge 17. The dotted and dashed lines show the character of the flexural distortion of the said section. At a given instant, the vibration is accompanied by four nodes 34, 35, 36 and 37, spaced 90° apart. At each node the motion of the drum periphery is that of harmonic rotation about the nodal point. At the antinodes, disposed intermediate the nodes, the motion is that of harmonic translation along the radius R drawn through the antinodal point (see Fig. 3). It will be seen, then, that when the middle of the bar 20 is instantaneously at a node, it is excited as shown in the dotted and dashed lines in Fig. 5, the forces tending to flex or deflect one arm outwardly from the center of the drum and the other arm inwardly toward the center of the drum. This operation requires that the bolts 28, 29 or equivalent means prevent rotation of the central portion of the bar relative to the drum. The arms 25 and 26 are described as cantilevers in a broad sense in that their deflection is transverse relative to the brake drum edge rather than normal thereto. When the bar 20 is instantaneously at an antinode, the forces tend to flex or deflect both arms outwardly or inwardly in the same radial direction. It is believed that the frictional displacement of the bar arms relative to the drum edge is greatest when the middle of the bar is in registry with a nodal point and that maximum damping then occurs. It is also considered that the frictional displacement and damping fall to their minima when the middle of the bar is in registry with an antinode. As the drum rotates relative to the shoes, the nodes and antinodes rotate, each bar receiving maximum excitation when its middle passes a node.

Friction damping causes a tuned bar to be effective in absorbing frequencies of a broad band on either side of the undamped natural period of the bar. Friction damping is here provided by the bearing surfaces 32 and 31, frictionally contacting the drum edge 17.

The vibrations of arms 25 and 26 of each bar have such phase relationship with respect to the primary mechanical vibrations of the drum that the reactions of the bars tend to neutralize the effect of the disturbing forces which normally cause brake squeal in accordance with general physical laws explained in the United States Patent to Frahm 989,958, issued April 11, 1911. It should be noted that we provide tuned secondary bodies or bars, each arm being tuned for a fundamental frequency within the squeal frequency band, each arm having the resilience and inertial parameters of a cantilever. It is desirable to use a body of larger mass, tuned to a low frequency within the spectrum of brake-squeal rather than a body of smaller mass, tuned to a high frequency. Having first provided the vibration neutralizing body or bar, then we broaden its response to include others in the brake-squeal spectrum, using damping means for that purpose.

Complete squeal-elimination is accomplished by two pairs of bars, but a larger number, such as six or eight, may be provided if desired. In the preferred embodiment, all bars are alike and they conform to the following specifications:

Weight of drum, 126 lbs.
Diameter of drum, 16½"—dia. braking surface
Distance between apertures for two bolts, 1⅛" center to center of bolts
Width of bars, 1" radially of drum
Depth of bearing areas—31' and 32', .044" axially of drum
Length of bars, 5½" chord, from bolt to end
Radius of curvature, 8½" inside radius
Weight of bars, 2 lbs. 8 oz. each
Frequency of oscillation of bar ends, 1070 cycles per second
Thickness of bars, ¾" axially of drum
Type of material, etc., SAE-1020 steel ⅜" bolts were used, tightened to approximately 25 ft. lbs. torque. Each half bar was deflected .044". It was calculated that the approximate pressure between the center of each bar and the drum was 4000 lbs. per bolt or 8000 lbs. per bar.

The described construction constituting bars of equal lengths can be varied by providing bars of unequal length and tuned to different frequencies, which are symmetrically disposed around the edge of the drum, in order to achieve balance, with suitable friction applied to each bar to broaden its frequency response.

If desired, bars may be made integrally with a cast drum with provision for frictional contact at their ends by means of pressure screws.

While there have been shown and described what are at present believed to be the preferred embodiments of the present invention, it will be obvious to those skilled in the art that various substitutes or equivalents may be made without departing from the true invention as defined by the appended claims.

Having fully disclosed and described our invention, we claim:

1. A brake drum squeal preventing device comprising in combination a brake drum having a peripheral edge, a pair of secondarily resonant bodies oppositely disposed on said edge along one diameter of said drum, a second pair of secondarily resonant bodies oppositely disposed on said edge along another diameter of said drum 90 degrees removed from the first pair, each of said bodies comprising an arcuate mass extending around said drum edge for approximately 90 degrees, each of said bodies being cambered against said drum edge so that the ends thereof are in contact therewith, openings adjacent the central portion of each of said bodies and means extending through said openings non-rotatably securing the central portion of each of said bodies contiguously to said drum edge.

2. A device for rendering inaudible the sound producing vibrations of a brake drum having a laterally projecting circular edge comprising four circumferentially symmetrically and diametrically oppositely disposed members mounted on said edge and curved to conform segmentally with said edge, each of said members being formed with secondarily resonant cantilevers which vibrate in response to the primary vibration of said drum, each of said cantilevers having a spaced bearing area contacting said edge, and bolts intermediate said areas, non-rotatably securing said members to said edge whereby frictional contact between the bearing areas of said cantilevers and edge is established and the intermediate portions of said members are forced tightly against said edge.

3. A device for rendering inaudible the undesired primary sound producing vibrations of a brake drum having a laterally projecting edge comprising a secondary vibratory means non-rotatably secured to the edge of said drum and having a natural frequency near the low frequency end of the primary vibration spectrum of said drum for absorbing its sound producing vibrations, said secondarily vibratory means comprising a bar of metal formed to define near its extremities frictional bearing areas in contact with the edge of said drum, the intermediate portion of said bar being rigidly attached to the edge of said drum.

4. In combination with a brake drum having a laterally projecting edge means for rendering inaudible the primary vibrations of said drum comprising a plurality of tuned secondary vibratory bars, each having a plurality of spaced frictionally contacting areas on the edge of said drum and means for non-rotatably securing each of said members contiguously to the edge of said drum intermediate its bearing areas.

5. In a device for preventing vibration of a brake drum having an outstanding peripheral edge a member comprising a pair of tuned arms which flex in vibration upon excitation by the vibration of said drum, each of said tuned arms having a frictional bearing point adjacent the peripheral edge of said drum, and means intermediate the bearing areas for non-rotatably securing said member to said drum with the intermediate portion of said member in touching engagement with said drum edge, said member conforming to the curvature of said edge.

6. In a device for rendering inaudible undesired vibrations of a brake drum having a flat peripheral edge, the improvement comprising a symmetrically disposed pair of cambered members, each member having a pair of cantilever arms at the extremities of which are disposed frictional bearing areas for engagement with said edge, means for non-rotatably securing the portions of said members intermediate the frictional bearing areas in contiguous engagement with said edge, the bearing areas of said cantilever arms being disposed apart by a distance approximating the distance between antinodes of the drum and being held in contact with said edge by said securing means.

JAMES F. CHAPMAN.
ELMER LATSHAW.

REFERENCES CITED

The following references are of record in the file of this patent:

UNITED STATES PATENTS

| Number | Name | Date |
| --- | --- | --- |
| 1,934,444 | Norton | Nov. 7, 1933 |
| 1,935,393 | Dodge | Nov. 14, 1933 |
| 1,940,449 | Dodge | Dec. 19, 1933 |
| 2,287,984 | Glazebrook | June 30, 1942 |

FOREIGN PATENTS

| Number | Country | Date |
| --- | --- | --- |
| 580,685 | Germany | May 28, 1932 |